United States Patent
Ma et al.

(10) Patent No.: US 9,882,726 B2
(45) Date of Patent: Jan. 30, 2018

(54) METHOD AND APPARATUS FOR INITIAL CERTIFICATE ENROLLMENT IN A WIRELESS COMMUNICATION SYSTEM

(71) Applicant: MOTOROLA SOLUTIONS, INC, Schaumburg, IL (US)

(72) Inventors: Ding Ma, Inverness, IL (US); Jonathan P. Akers, Volo, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 45 days.

(21) Appl. No.: 14/719,727

(22) Filed: May 22, 2015

(65) Prior Publication Data

US 2016/0344559 A1    Nov. 24, 2016

(51) Int. Cl.
*H04L 9/32* (2006.01)
*H04W 12/06* (2009.01)
*H04L 29/06* (2006.01)
*G06F 21/32* (2013.01)
*H04L 9/00* (2006.01)

(52) U.S. Cl.
CPC .......... *H04L 9/3263* (2013.01); *H04L 9/3231* (2013.01); *H04L 9/3268* (2013.01); *H04L 63/0823* (2013.01); *H04L 63/0861* (2013.01); *H04L 63/18* (2013.01); *H04W 12/06* (2013.01); *G06F 21/32* (2013.01); *H04L 9/006* (2013.01)

(58) Field of Classification Search
USPC ....................................................... 713/158
See application file for complete search history.

(56) References Cited

U.S. PATENT DOCUMENTS

| | | | |
|---|---|---|---|
| 7,366,904 B2 | 4/2008 | Roh | |
| 2003/0196084 A1* | 10/2003 | Okereke | H04L 63/0281 713/156 |
| 2008/0222711 A1* | 9/2008 | Michaelis | G07C 9/00039 726/7 |
| 2010/0122081 A1* | 5/2010 | Sato | H04L 9/0891 713/158 |
| 2013/0073856 A1 | 3/2013 | Sherkin et al. | |
| 2013/0247161 A1* | 9/2013 | Bajko | H04L 9/3268 726/7 |

OTHER PUBLICATIONS

The International Search Report and The Written Opinion, SN: PCT/US2016/032664, filed: May 16, 2016, dated Oct. 7, 2016, all pages.

* cited by examiner

*Primary Examiner* — Jeffrey Pwu
*Assistant Examiner* — Samuel Ambaye (57) ABSTRACT

A method and apparatus are provided for initial certification enrollment in a wireless communication system. A first mobile device establishes a first wireless connection with an infrastructure and a second wireless connection with a second mobile device. The first mobile device receives, from the second mobile device, a first certification request that includes a request for a digital certificate for the second mobile device and first biometric data associated with a user of the first mobile device. The first mobile device obtains second biometric data associated with a user of the second mobile device and conveys a second certification request to the infrastructure that includes the request for the digital certificate for the second mobile device and the first and second biometric data. The first mobile device then receives, from the infrastructure, the digital certificate for the second mobile device and forwards, to the second mobile device, the digital certificate.

11 Claims, 6 Drawing Sheets

METHOD AND APPARATUS FOR INITIAL CERTIFICATE ENROLLMENT IN A WIRELESS COMMUNICATION SYSTEM

FIELD OF THE INVENTION

The present invention relates generally to wireless communication systems, and in particular to a method and apparatus for certificate enrollment in a wireless communication system.

BACKGROUND OF THE INVENTION

In a highly secured wireless communication system, employees may be required to use at least one layer of security tunnels to access their corporate or enterprise applications or data remotely. The most commonly used secure tunnel technology is an Internet Protocol Security (IPsec) Virtual Private Network (VPN), which typically uses a public key infrastructure (PKI) certificate-based Internet Key Exchange protocol (IKE or IKEv2) to establish a secure tunnel.

A PKI scheme uses a digital certificate to verify that a particular public key belongs to a certain end entity and may be used for access control. The certificate is an electronic document that is issued by a trusted party and that is used to prove ownership of a public key. The certificate includes information about the key and an identity of the key owner, and further includes a digital signature of a Certificate Authority (CA), that is, an entity that has verified that the certificate's contents are correct. In order to obtain a certificate, a user, that is, a mobile device of a user, has to go through a PKI enrollment process with a PKI infrastructure that was set up by his or her organization. In most cases, the PKI infrastructure contains at least one CA, which issues and controls the life cycle of all certificates, and a Registration Authority (RA) that performs the user/mobile device authentication for the CA before any certificate can be generated for the user/mobile device. The authentication of a new user/mobile device as part of an initial certificate enrollment often involves a lot of manual operations, as the mobile device does not have any credential that can authenticate the mobile device to the organization's network before the initial certificate enrollment.

A typical solution for the initial certificate enrollment involves use of a personal computer (PC) that is trusted by the organization's network. The user needs to generate a certificate signing request (CSR) file on the user's mobile device and then transfer the CSR file to the PC using a wired connection, such as universal serial bus (USB) interface. The user then uses the PC to submit the CSR to the RA or CA in order to obtain a certificate over the organization's network. In highly secured systems such as government and defense networks, the user may have to give the user's mobile device to a system administrator, who would perform the initial enrollment using a PC that is located in a controlled environment.

Another approach for initial certificate enrollment involves use of a Trusted Platform Module (TPM) chip. Based on the current TPM 2.0 standards, a manufacturer of the TPM chip puts in a unique root key pair (usually RSA) in each TPM during the manufacturing process. A mobile device with a TPM can ask the TPM to sign/encrypt messages sent to the network during initial enrollment. However, the keys are generated outside of the control of the organization/enterprise that operates the wireless system and this approach works only if the organization/enterprise that operates the wireless system trusts the keys trusts the TPM manufacturer. This kind of inter-organization trust is generally not permitted in highly secured government and public safety systems.

BRIEF DESCRIPTION OF SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method and apparatus are provided that provide initial certification enrollment in a wireless communication system. A first mobile device establishes a first wireless connection with an infrastructure and establishes a second wireless connection with a second mobile device. The first mobile device receives a first certification request from the second mobile device over the second wireless connection, wherein the first certification request comprises a request for a digital certificate for the second mobile device and first biometric data associated with a user of the first mobile device. The first mobile device obtains second biometric data, wherein the second biometric data is associated with a user of the second mobile device, and conveys a second certification request to the infrastructure and over the first wireless connection, wherein the second certification request comprises the request for the digital certificate for the second mobile device, the first biometric data, and the second biometric data. In response to conveying the second certification request to the infrastructure, the first mobile device receives, from the infrastructure and over the first wireless connection, the digital certificate for the second mobile device and conveys, to the second mobile device over the second wireless connection, the digital certificate.

Generally, an embodiment of the present invention encompasses a method for providing initial certification enrollment in a wireless communication system. The method includes establishing, by a first mobile device, a first wireless connection with an infrastructure; establishing, by the first mobile device, a second wireless connection with a second mobile device; receiving, by the first mobile device, a first certification request from the second mobile device and over the second wireless connection, wherein the first certification request comprises a request for a digital certificate for the second mobile device and first biometric data associated with a user of the first mobile device; obtaining second biometric data, wherein the second biometric data is associated with a user of the second mobile device; and conveying a second certification request to the infrastructure and over the first wireless connection, wherein the second certification request comprises the request for the digital certificate for the second mobile device, the first biometric data, and the second biometric data. The method further includes, in response to conveying the second certification request to the infrastructure, receiving, from the infrastructure and over the first wireless connection, the digital certificate for the second mobile device; and conveying, to the second mobile device over the second wireless connection, the digital certificate.

Another embodiment of the present invention encompasses a mobile device capable of facilitating initial certification enrollment in a wireless communication system, the mobile device comprising a processor and an at least one memory device. The at least one memory device is configured to store instructions that, when executed by the processor, cause the processor to establish a first wireless connection with an infrastructure; establish a second wireless connection with another mobile device; receive a first certification request from the another mobile device and over the second wireless connection, wherein the first certification request comprises a request for a digital certificate for the another mobile device and first biometric data associated with a user of the mobile device; obtain second biometric data, wherein the second biometric data is associated with a user of the another mobile device; and convey a second certification request to the infrastructure and over the first wireless connection, wherein the second certification request comprises the request for the digital certificate for the another mobile device, the first biometric data, and the second biometric data. The at least one memory device further is configured to store instructions that, when executed by the processor, cause the processor to, in response to conveying the second certification request to the infrastructure, receive, from the infrastructure and over the first wireless connection, the digital certificate for the another mobile device; and convey, to the another mobile device over the second wireless connection, the digital certificate.

Yet another embodiment of the present invention encompasses a public key infrastructure (PKI) device comprising a processor and an at least one memory device. The at least one memory device is configured to store instructions that, when executed by the processor, cause the processor to receive, from a first mobile device, a certification request comprising a request for a digital certificate for a second mobile device, first biometric data associated with a user of the first mobile device, and second biometric data associated with a user of the second mobile device; verify an identity of the user of the first mobile device and an identity of the user of the second mobile device based on the first biometric data and the second biometric data; and issue the digital certificate in response to verifying the identity of the user of the first mobile device and the identity of the user of the second mobile device.

Still another embodiment of the present invention encompasses a PKI device comprising a processor and an at least one memory device that is configured to maintain a Certificate Revocation List (CRL) and a Certificate Authorization List (CAL), wherein the CAL comprises a list of digital certificate serial numbers or hashes of digital certificate serial numbers that are associated with mobile devices that are authorized to participate in a given incident response.

Figure 1:
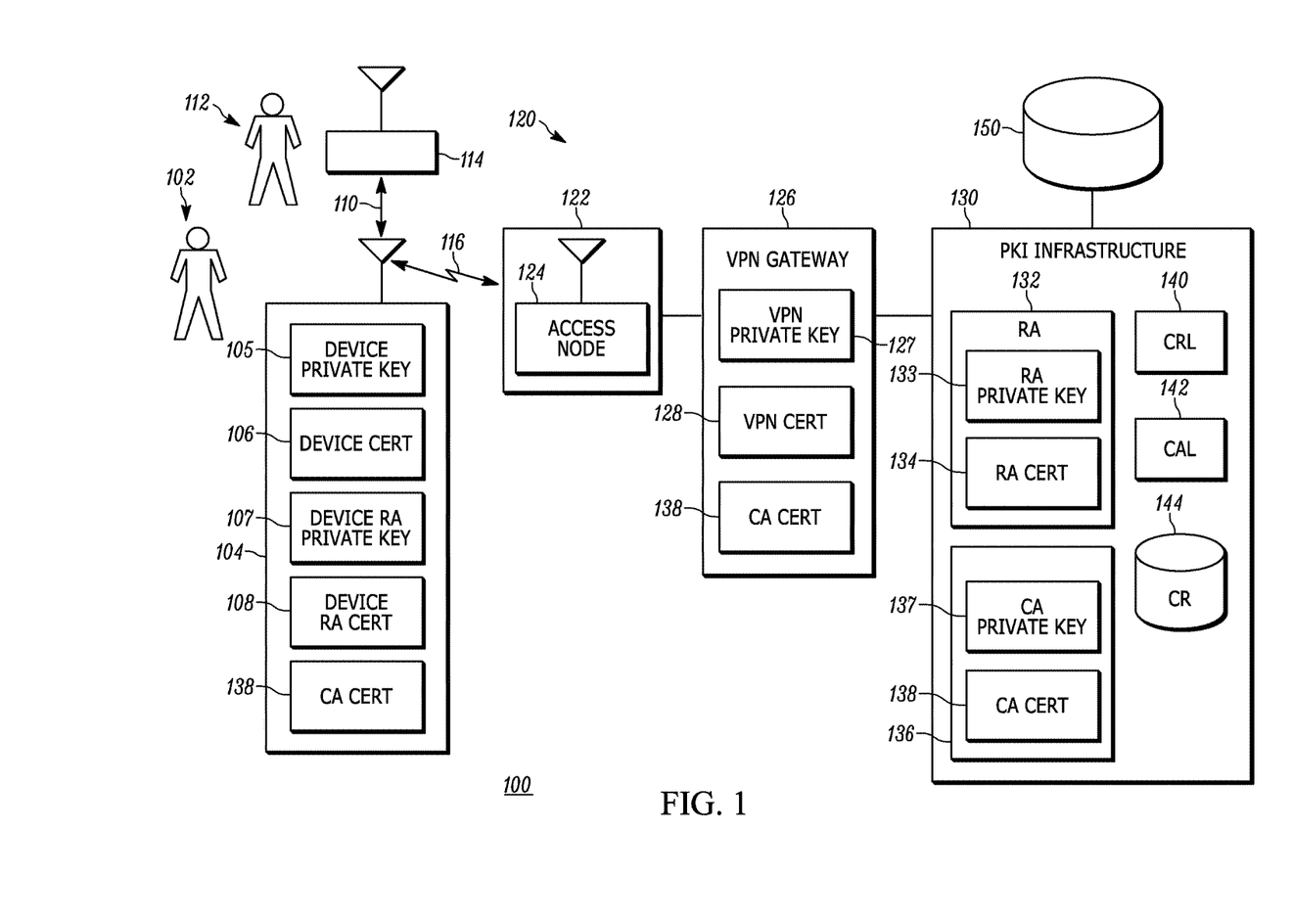
FIG. 1 is a block diagram of a communication system in which service instance selection is implemented in accordance with some embodiments of the present invention.

The present invention may be more fully described with reference to FIGS. 1-4C. FIG. 1 is a block diagram of wireless communication system 100 in accordance with an embodiment of the present invention. Communication system 100 includes multiple mobile devices 104, 114 (two shown), and corresponding users 102, 112. In various embodiments of the present invention, users 102 and 112 may be a same or different user. Each mobile device 104, 114 may be any mobile device that is configured to request a digital certificate from a PKI device. For example, each mobile device 104, 114 may be a cellular telephone, a smart phone, a personal digital assistant (PDA), laptop computer, or personal computer with radio frequency (RF) capabilities, or any other type of mobile device with wide area wireless communication capabilities, such as wide area network (WAN) or wireless local area network (WLAN) capabilities, and/or short-range wireless communication capabilities, such as Bluetooth or near-field communication (NFC) capabilities. In various technologies, mobile devices 114 and 104 may be referred to as a mobile station (MS), user equipment (UE), user terminal (UT), subscriber station (SS), subscriber unit (SU), remote unit (RU), access terminal, and so on.

Communication system 100 further includes an infrastructure 120 comprising a radio access network (RAN) 122 in communication with a Virtual Private Network (VPN) gateway 126 and, via the VPN gateway, with multiple PKI devices 132, 136 (two shown), such as a Registration Authority (RA) 132 and a Certificate Authority (CA) 136, hosted in a PKI infrastructure 130. In various illustrative implementations, RA 132 and CA 136 each may be hosted on a same or a different server, which server(s) includes memory, a processor, and a suitable wired and/or wireless interface operatively coupled for communicating with one or more of the multiple mobile devices 104, 114 via RAN 122 and VPN gateway 126.

PKI infrastructure 130 further includes a Certificate Revocation List (CRL) 140, as known in the art, comprising a list of serial numbers of digital certificates that have been revoked, and a Certificate Authorization List (CAL) 142, comprising a signed list of digital certificates, digital certificate serial numbers, or hashes of serial numbers, associated with mobile devices that are authorized to participate in a given incident response. CRL 140 and CAL 142 may be maintained by CA 136 and distributed by RA 132, or may be maintained by one or more PKI devices separate from, and accessible by, each of RA 132 and CA 136. CRL 140 and CAL 142 may be conveyed, intermittently or periodically, by the PKI infrastructure to trusted mobile devices, such as mobile device 104 and VPN gateway 126.

A mobile device 104, 114 then can use CRL 140 to validate a digital certificate's revocation status during establishment of a secure tunnel using the PKI certificate-based Internet Protocol Security (IPsec) Internet Key Exchange protocol (IKE or IKEv2) and during other security protocol negotiations, such as Transport Layer Security (TLS). Further, a mobile device 104, 114 can use CAL 142 to determine what digital certificates/mobile devices are authorized to participate in a given security procedure. That is, a mobile device may only accept a digital certificate with a serial number or hash that is included in CAL 142 for given security procedure. Thus, CAL 142 can be used to provide automated ad-hoc mission-specific trust establishment. For example, at the beginning of a tactical mission, a team leader may have a trusted mobile device, such as mobile device 104, that helps provide initial certificate enrollment for mobile devices of other team members as described herein. After all mobile devices of all team members are enrolled, the trusted mobile device can generate a CAL for this specific mission and send the CAL to an RA, such as RA 132, in infrastructure 120. The RA then can send the CAL, for example, by use of PKI Certificate Management Protocol (CMP) messaging, to all mobile devices, such as mobile device 114, operated by other team members and to other equipment involved in the mission, such as unmanned drones, thereby facilitating the ability of the mobile devices and other equipment to engage with each other in secure communications during the mission. Any other mobile device with a valid certificate that is not indicated by the CAL cannot take part in the communications for the mission, even if its certificate may pass the traditional PKI validation.

Infrastructure 120 further includes a biometric data database 150 accessible by the multiple PKI devices 132, 136, which biometric data database stores subscriber, or user, identifiers in association with their biometric data. Biometric data database 150 may be hosted by, or separate from, PKI infrastructure 130. When a PKI device, such as PKI devices 132 and 136, provides biometric data to biometric data database 150, the biometric data database returns to the PKI device an identifier of a subscriber, or user, associated with the biometric data. RAN 122 includes one or more wireless access nodes 124 (one shown) that provides wireless communication services to mobile devices residing in a coverage area of the access node via a corresponding air interface, such as mobile devices 104 and 114 and air interface 116. Air interface 116 includes an uplink and a downlink, which uplink and downlink each includes multiple traffic channels and multiple signaling channels. While mobile devices 104 and 114 are depicted in FIG. 1 as being served by a same RAN, in other embodiments of the present invention each of mobile devices 114 and 104 may be served by a different RAN than the other mobile device, which different RANs may implement the same wireless technology or different wireless technologies, or may not be served by any RAN. For example, one of mobile devices 104 and 114 may be a narrowband mobile device served by a narrowband RAN and the other of mobile devices 104 and 114 may be a broadband mobile device served by a broadband RAN.

Wireless access node 124 may be any network-based wireless access node, such as a Node B, an evolved Node B (eNB), an access point (AP), or base station (BS). RAN 122 also may include one or more access network controllers (not shown), such as a Radio Network Controller (RNC) or a Base Station Controller (BSC), coupled to the one or more wireless access nodes; however, in various embodiments of the present invention, the functionality of such an access network controller may be implemented in the access node.

A first mobile device 104 of the multiple mobile devices 104, 114 of communication system 100 is assumed, for purposes of the present invention, to be a 'trusted' mobile device, that is, a mobile device that has already enrolled with, and obtained multiple digital certificates 106, 108, 138 from, the multiple PKI devices 132, 136. For example, in an Android operating system, a trusted mobile device, such as mobile device 104, may maintain multiple private keys 105, 107 (two shown) generated using digital signature algorithms (DSAs), such as Suite B Elliptic Curve DSAs (ECDSA), and the corresponding digital certificates, that is, digital certificates 106, 108, obtained from PKI infrastructure 130. Such digital certificates 106, 108 are considered device certificates that are signed by a private key 137 of CA 136. In addition to the device certificates 106 and 108, mobile device 104 also obtains a Certificate Authority (CA) certificate 138 from CA 136.

When bringing up a secure connection, such as an Internet Protocol Security (IPsec) Virtual Private Network (VPN) tunnel, with VPN gateway 126, mobile device 104 presents its device certificate 106 to VPN gateway 126 and validates, using CA certificate 138, a gateway/server certificate 128 (also referred to herein as VPN certificate 128) presented by VPN gateway 126. Further, in establishing the secure connection with mobile device 104, VPN gateway 126 provides VPN certificate 128 to mobile device 104 and verifies, using CA certificate 138, device certificate 106 of mobile device 104. Similarly, mobile device 104 can establish a secure tunnel with another device, such as a device of PKI infrastructure 130 or mobile device 114. Device certificate 108, also referred to herein as device RA certificate 108, and its associated private key 107 are used by mobile device 104 for performing Registration Authority (RA) functionality.

Each of digital certificates 106, 108, and 138 includes a public key, that is, '$K_{PUB\_106}$,' '$K_{PUB\_108}$,' and $K_{PUB\_138}$,' respectively, and further includes subject information/identity information of the key owner. Each of public keys $K_{PUB\_106}$, $K_{PUB\_108}$, and $K_{PUB\_138}$, has a corresponding private key, that is, $K_{PVT\_105}$, $K_{PVT\_107}$, and $K_{PVT\_137}$, that is maintained by the key owner. For example, device certificate 106 comprises a public key $K_{PUB\_106}$ corresponding to private key 105, that is, $K_{PVT\_105}$, of mobile device 104, device RA certificate 108 comprises a public key $K_{PUB\_108}$ corresponding to private key 107, that is, $K_{PVT\_107}$, used by mobile device 104 when functioning as an RA, and CA certificate 138 comprises a public key, $K_{PUB\_138}$, corresponding to a CA private key 137, that is, $K_{PVT\_137}$, of CA 136. In other words, $K_{PUB\_106}/K_{PVT\_105}$ are a public/private key pair associated with mobile device 104 and device certificate 106, $K_{PUB\_108}/K_{PVT\_107}$ are a public/private key pair associated with mobile device 104 and device RA certificate 108, and $K_{PUB\_138}/K_{PVT\_137}$ are a public/private key pair associated with CA certificate 138 and CA 136. Based on the trust of CA certificate 138 by all the devices in the system, the trusted mobile device, that is, mobile device 104, is able to establish a secure connection or "tunnel," for example, an IPsec VPN tunnel, with infrastructure 120, and in particular VPN gateway 126, of communication system 100. And as device RA certificate 108 is also issued by CA 136 (and is signed by CA private key 137, that is, $K_{PVT\_137}$), trusted mobile device 104 is able to establish a direct secure tunnel to RA 132 to make the functionality of RA 132 available to other mobile devices, such as mobile device 114.

A second mobile device 114 of the multiple mobile devices 104, 114 is an end entity that that has not yet obtained a digital certificate from PKI infrastructure 130 and, correspondingly, lacks the capability to set up a secure connection or tunnel with infrastructure 120.

Mobile devices 104 and 114 are "paired" to collaborate so that information sent to, or received from, one of mobile devices 104, 114 may be based on information sent to, or received from, the other mobile device 114, 104, respectively. "Pairing" the devices means that the devices are within range of each other and establish a connection via a short-range wireless link 110, such as a Bluetooth link, a near-field communication (NFC) link, or a Wi-Fi link. The ability to perform device collaboration between mobile devices 104 and 114 enables mobile device 114 to use mobile device 104 as proxy to communicate with infrastructure 120.

As elements of RAN 122, such as access node 124, and gateway 126, the multiple PKI devices 132, 136, and biometric data database 150 are each an element of infrastructure 120, each may be referred to as an infrastructure element of communication system 100. Infrastructure 120 can be any type of communication network, wherein the mobile devices communicate with infrastructure elements using any suitable over-the-air protocol and modulation scheme. Although not shown, infrastructure 120 may comprise a further number of infrastructure elements for a commercial embodiment that are commonly referred to as, but not limited to, bridges, switches, zone controllers, routers, authentication centers, or any other type of infrastructure equipment facilitating communications between entities in a wireless or wired environment. Finally, it should be noted that communication system 100 is illustrated by reference to a limited number of devices for ease of illustration. However, any suitable number of PKI devices, mobile devices, and infrastructure elements may be implemented in a commercial system without loss of generality of the teachings herein.

Figure 2:
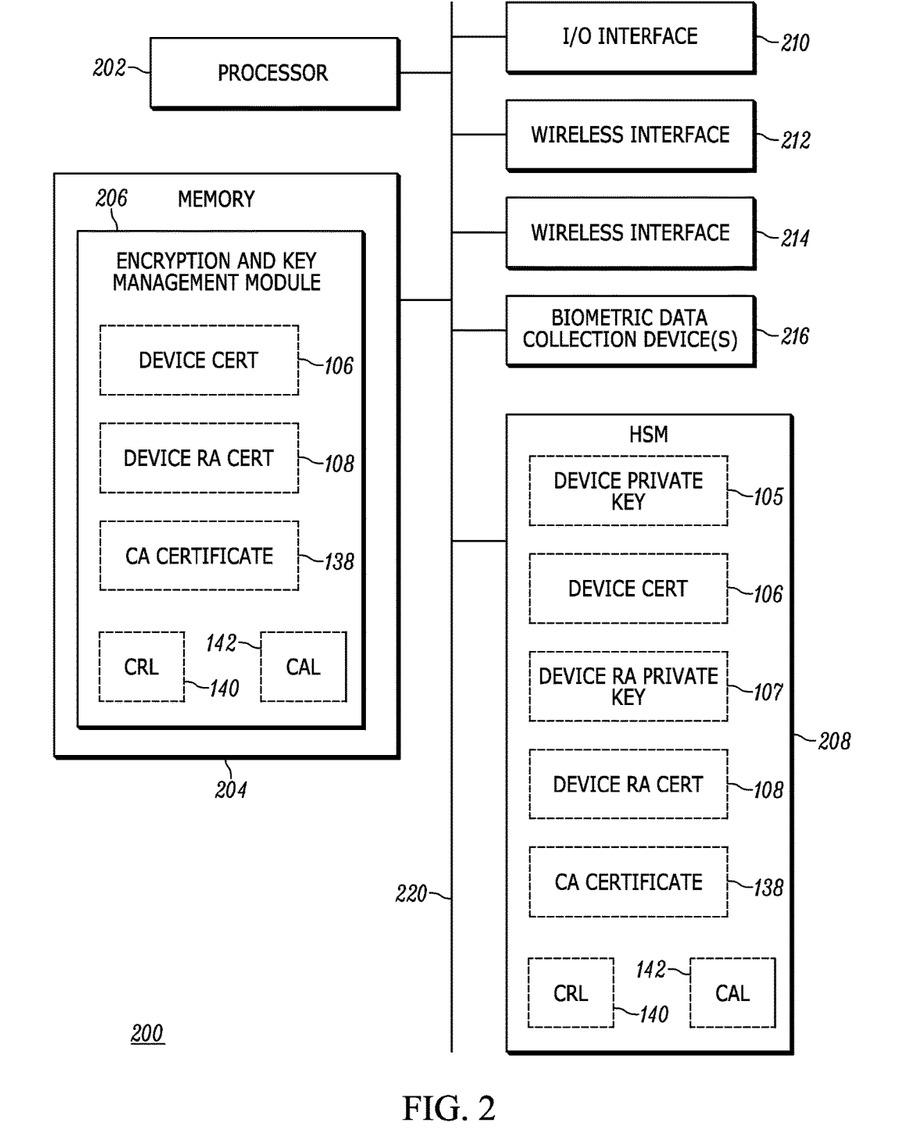
FIG. 2 is a block diagram of a mobile device of the communication system of FIG. 1 in accordance with some embodiments of the present invention.

Referring now to FIG. 2, a block diagram is provided of a mobile device 200, such as mobile devices 104 and 114, in accordance with some embodiments of the present invention. Mobile device 200 generally includes a processor 202, at least one memory device 204, one or more input/output (I/O) interfaces 210 (one shown), one or more wireless interfaces 212, 214 (two shown), and one or more biometric data collection devices 216 (one shown). It should be appreciated by those of ordinary skill in the art that FIG. 2 depicts mobile device 200 in an oversimplified manner, and a practical embodiment may include additional components and suitably configured processing logic to support known or conventional operating features that are not described in detail herein.

Mobile device 200 operates under the control of processor 202, such as one or more microprocessors, microcontrollers, digital signal processors (DSPs), combinations thereof or such other devices known to those having ordinary skill in the art. Processor 202 operates the corresponding mobile device according to data and instructions stored in the at least one memory device 204, such as random access memory (RAM), dynamic random access memory (DRAM), and/or read only memory (ROM) or equivalents thereof, that stores data and instructions that may be executed by the corresponding processor so that the mobile device may perform the functions described herein.

The data and instructions maintained by at least one memory device 204 include software programs that include an ordered listing of executable instructions for implementing logical functions. For example, the software in at least one memory device 204 includes a suitable operating system (O/S) and programs. The operating system essentially controls the execution of other computer programs, and provides scheduling, input-output control, file and data management, memory management, and communication control and related services. The programs may include various applications, add-ons, etc. configured to provide user functionality with mobile device 200. Further, at least one memory device 204 maintains one or more mobile device identifiers, such as a mobile station identifier (MS ID), a subscriber unit identifier (SU ID), an International Mobile Subscriber Identity (IMSI), or a Temporary Mobile Subscriber Identity (TMSI), that uniquely identifies the mobile device in communication system 100.

Mobile device 200 includes encryption and key management functionality. For example, at least one memory device 204 can include a software-based encryption and key management module 206 that comprises programs, for example, an algorithm, for generating a key pair, that is, a private key ($K_{PVT}$) and a corresponding public key ($K_{PUB}$) of the mobile device, for compiling other information necessary to create a certification request, such as a Certificate Signing Request (CSR), a certification response, and a certificate confirmation with respect to an obtaining of a digital certificate, such as device certificate 106, as described herein, and for maintaining keys, tokens, and digital certificates, such as private keys 105 ($K_{PVT\_105}$) and 107 ($K_{PVT\_107}$), device certificate 106 (and corresponding public key $K_{PUB\_106}$), device RA certificate 108 (and corresponding public key $K_{PUB\_108}$), CA certificate 138 (and corresponding public key $K_{PUB\_138}$), CRL 140, and CAL 142. However, in another embodiment of the present invention, mobile device 200 may additionally, or instead, include a hardware security module (HSM) 208. HSM 208 is a hardware-based encryption and key management device that can provide hardware-based cryptographic functions, such as Suite B cryptographic functions stores, and that can store, and provide tamper protection for, keys, tokens, and digital certificates, such as device private keys 105 and 107, device certificates 106 and 108, CA certificate 138, CRL 140, and CAL 142. From a practical standpoint, when HSM 208 is used, the device private keys 105 and 107 are generated in the HSM 208 and are not exposed to any other component of the mobile device, but device certificate 106, device RA certificate 108, CA certificate 138, CRL 140, and CAL 142 can be copied to at least one memory device 204 for efficiency of crypto operations. For example, HSM 208 may be a CRYPTR micro chip available from Motorola Solutions, Inc., of Schaumburg, Ill., which micro chip may be installed in a microSD slot of a mobile device. A CRYPTR-based PKI operation is more secure than a software-based key storage approach, such as performed by encryption and key management module 206. That is, the CRYPTR generates and stores private keys in a tamper resistant hardware security module. For any PKI operation, data is sent to the CRYPTR and the CRYPTR does the signing and returns the signed data to a requesting application. Thus, the private keys are never exposed to any application executing on a mobile device.

I/O interfaces 210 may include user interfaces that allow a user to input information in, and receive information from, mobile device 200. For example, the user interfaces may include a keypad, a touch screen, a scroll ball, a scroll bar, buttons, bar code scanner, and the like. Further, the user interfaces may include a display device such as a liquid crystal display (LCD), touch screen, and the like for displaying system output. I/O interfaces 212 also can include, for example, a serial port, a parallel port, a small computer system interface (SCSI), an infrared (IR) interface, a universal serial bus (USB) interface, a microSD slot, and the like for communicating with, or coupling to, an external device.

The one or more wireless interfaces 212, 214 facilitate an exchange wireless communications with other mobile devices and/or with RAN 122. For example, the one or more wireless interfaces 212, 214 may include a first, short-range wireless interface 212 for short-range communications, such as over short-range wireless link 110. For example, short-range wireless interface 212 may be a near-field communication (NFC) apparatus that includes an NFC transceiver and antenna, a Bluetooth apparatus that includes a Bluetooth transceiver and antenna, or a wireless local area network (WLAN) apparatus that includes a WLAN transceiver and antenna. Further, the one or more wireless interfaces 212, 214 may include a second, longer range wireless interface 214, such as a wireless area network (WAN) radio transceiver with a corresponding antenna.

The one or more biometric data collection devices 216 collect biometric data from a mobile device user, for example, users 102 and 112 of mobile devices 104 and 114, and store the collected biometric data in at least one memory device 204. For example, the one or more biometric data collection devices 216 may include an imaging device, such as a digital camera, that the user can use to take his or her picture, a fingerprint scanner that the user can use to scan his or her fingerprint into mobile device 200, or a microphone that collects audio, and correspondingly identifying vocal patterns, of a user. The stored biometric data then can be provided by mobile device 200 to another device of communication system 100, such as another mobile device or PKI devices 132 and 136, and be used to verify an identity of the user associated with the biometric data.

The components (202, 204, 208, 210, 212, 214, and 216) of mobile device 200 are communicatively coupled via a local interface 220. Local interface 220 can be, for example but not limited to, one or more buses or other wired or wireless connections, as is known in the art. Local interface 230 can have additional elements, which are omitted for simplicity, such as controllers, buffers (caches), drivers, repeaters, and receivers, among many others, to enable communications. Further, local interface 220 may include address, control, and/or data connections to enable appropriate communications among the aforementioned components.

Figure 3:
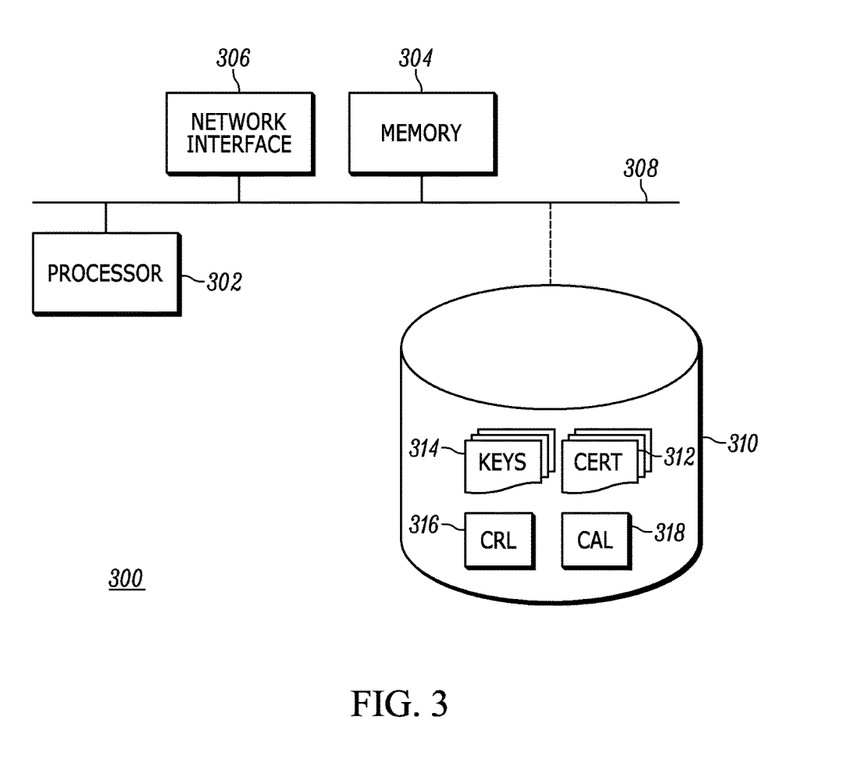
FIG. 3 is a block diagram of a public key infrastructure (PKI) device of the communication system of FIG. 1 in accordance with some embodiments of the present invention.

Referring now to FIG. 3, a block diagram is provided of a PKI device 300, such as PKI devices 132 and 136, in accordance with some embodiments of the present invention. PKI device 300 operates under the control of a processor 302 such as one or more microprocessors, microcontrollers, digital signal processors (DSPs), combinations thereof or such other devices known to those having ordinary skill in the art. Processor 302 operates the PKI device according to data and instructions stored in an at least one memory device 304, such as random access memory (RAM), dynamic random access memory (DRAM), and/or read only memory (ROM) or equivalents thereof, that stores data and programs that may be executed by the corresponding processor so that the server may perform the functions described herein.

PKI device 300 further includes one or more network interfaces 306 for connecting to other elements of infrastructure 120, such as VPN gateway 126, and, via the gateway, to other devices of communication system 100, such as mobile devices 104 and 114. The one or more network interfaces 306 may include a wireless, a wireline, and/or an optical interface that is capable of conveying messaging, such as data packets, to, and receiving messaging from, gateway 126.

PKI device 300 further includes, or is in communication with via the one or more network interfaces 306, a Certificate Repository (CR) 310, such as CR 144, typically implemented with a database, that is used to provide persistent storage for digital certificates 312, such as RA certificate 134, CA certificate 138, and digital certificates associated with mobile devices 104, 114, which digital certificates may be used by the PKI device to validate, and securely communication with, the mobile devices and/or their users. CR 310 further stores and provides public and private keys 314 associated with the PKI devices using the CR and mobile devices served by the CR, such as a private key 133 of RA 132, private key 137 of CA 136, private keys 105 and 107 of mobile device 104, and their corresponding public keys. Additionally, CR 310 stores a CRL 316, such as CRL 140, and a CAL 318, such as CAL 142. In various embodiments of the present invention, CR 310, may be implemented by RA 132 or CA 136, may be distributed between RA 132 and CA 136, or may be implemented by a PKI device of PKI infrastructure 130 that is separate from, and accessible by, each of RA 132 and CA 136.

The components (302, 304, 306, 310) of PKI device 300 are communicatively coupled via a local interface 308. Local interface 306 can be, for example but not limited to, one or more buses or other wired or wireless connections, as is known in the art. Local interface 308 can have additional elements, which are omitted for simplicity, such as controllers, buffers (caches), drivers, repeaters, and receivers, among many others, to enable communications. Further, local interface 308 may include address, control, and/or data connections to enable appropriate communications among the aforementioned components.

Unless otherwise specified herein, the functionality described herein as being performed by a mobile device, such as mobile devices 104 and 114, and by a PKI device, such as PKI devices 132 and 136, is implemented with or in software programs and instructions stored in the respective at least one memory device 204, 304 of the mobile device and PKI device and executed by the associated processor 202, 302 of the mobile device and PKI device.

The teachings herein are directed to methods for initial certificate enrollment for a newly enrolling mobile device, such as mobile device 114. Initial certificate enrollment as discussed herein is directed to a process associated with obtaining an initial digital certificate for an end entity, such as mobile device 114, from a PKI device, such as RA 132 and CA 136. In the prior art, during certificate enrollment, an end entity sends an initial certificate signing request (CSR) to a PKI device(s) to request a certificate from the PKI device(s). However, because this is the initial CSR, if the PKI device(s) has not issued any prior certificates to the end entity, the end entity typically would not have a reliable means of cryptographically protecting and binding the initial CSR before sending the initial CSR across a communication system. To prevent unauthorized access to the initial CSR that may result in the CA issuing a legitimate certificate to a compromised CSR, the initial CSR sent from the end entity has to be protected.

Accordingly, in communication system 100, a newly enrolling mobile device, that is, second mobile device 114 (also referred to herein as 'new mobile device 114'), uses short-range wireless link 110 to establish a secure channel (for example, secured by keys and/or by visual validation due to the close proximity of the users of the mobile devices) with an already enrolled, trusted mobile device, that is, first mobile device 104 (also referred to herein as 'trusted mobile device 104'), through pairing, for example, utilizing an encryption and key management module 206 and/or a hardware security module (HSM) 208. New mobile device 114 generates a certification request and conveys, to trusted mobile device 104, the certification request along with biometric data associated with user 112 of new mobile device 114. Trusted mobile device 104 acts as a registration authority (RA) and uses its own secured network connection to infrastructure 120 to carry out the initial certificate enrollment on behalf of mobile device 114 with RA 132 and/or CA 136. More particularly, trusted mobile device 104 validates the certification request received from new mobile device 114 and assembles a message that includes at least a portion of the received certification request along with the biometric data of user 112 of new mobile device 114. Trusted mobile device 104 signs the message using its own private key and then conveys, to PKI devices 132, 136 over the trusted mobile device's secured network connection to infrastructure 120, the signed message. In response to receiving the signed message, PKI devices 132, 136 verify an identity of user 112 based on the received biometric data and issue a new certificate for new mobile device 114. PKI devices 132, 136 then convey the new certificate to new mobile device 114 via trusted mobile device 104 and the secured tunnel between the trusted mobile device and infrastructure 120.

In various other embodiments of the present invention, this certificate enrollment procedure may be enhanced with extra authentication, for example, using signatures generated and verified with key pairs of both of mobile devices 104 and 114. An advantage of this procedure is that as more mobile devices become trusted through this procedure, it becomes easier to enroll new mobile devices remotely, thereby creating a cascading enrollment solution that allows large numbers of mobile devices to be enrolled quickly.

Figure 4A:
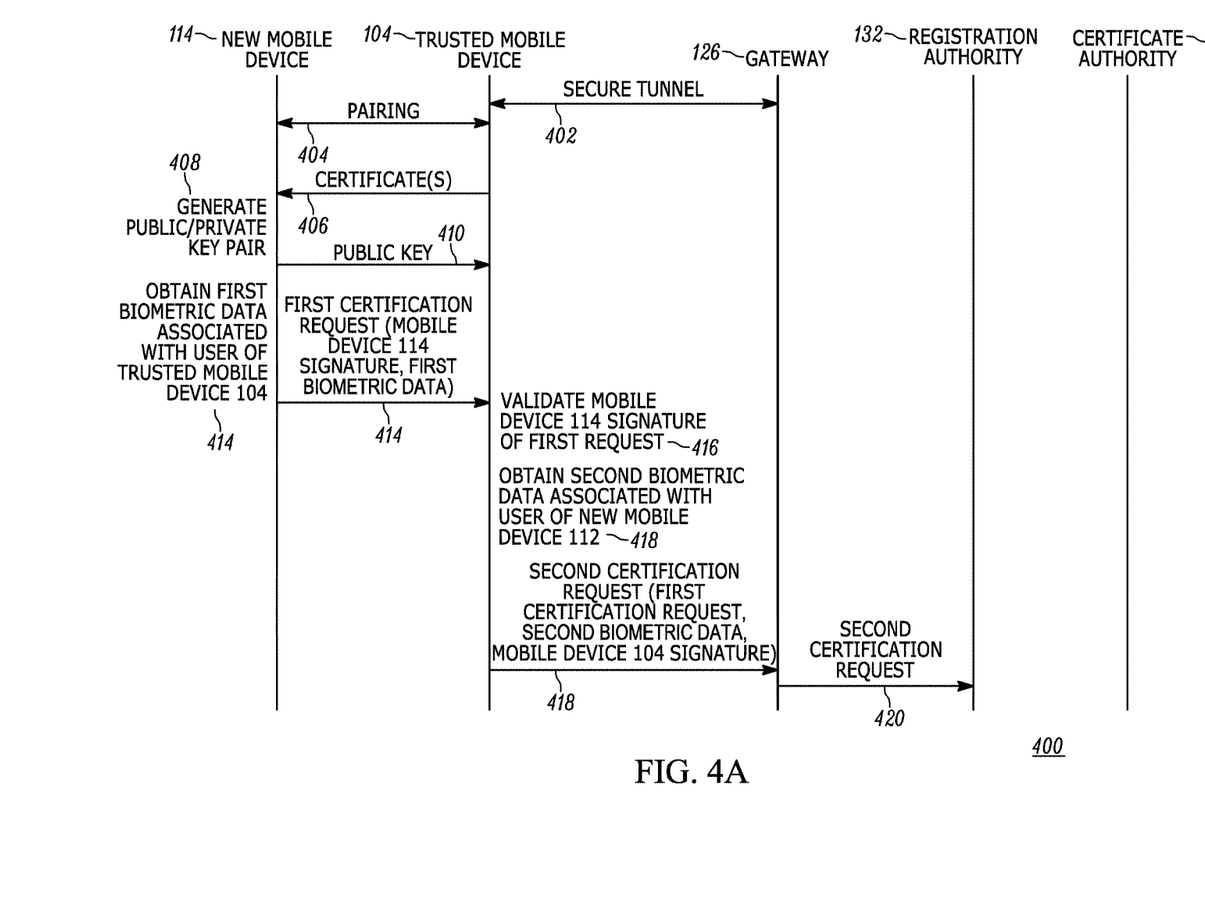
FIG. 4A is a message flow diagram illustrating a method performed by the communication system of FIG. 1 in performing an initial certificate enrollment of a mobile device in accordance with some embodiments of the present invention.
Figure 4B:
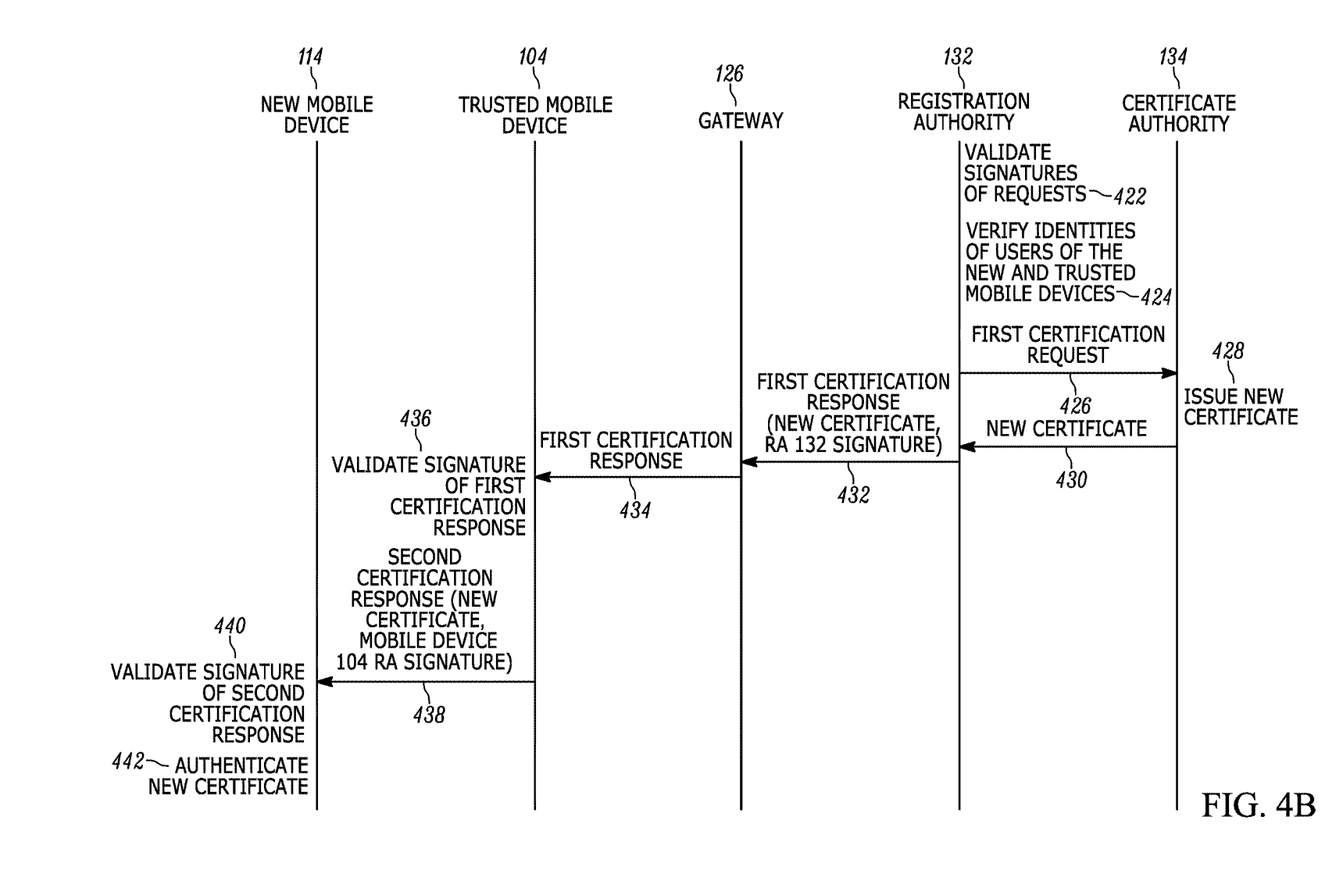
FIG. 4B is a continuation of the message flow diagram of FIG. 4A illustrating a method performed by the communication system of FIG. 1 in performing an initial certificate enrollment of a mobile device in accordance with some embodiments of the present invention.
Figure 4C:
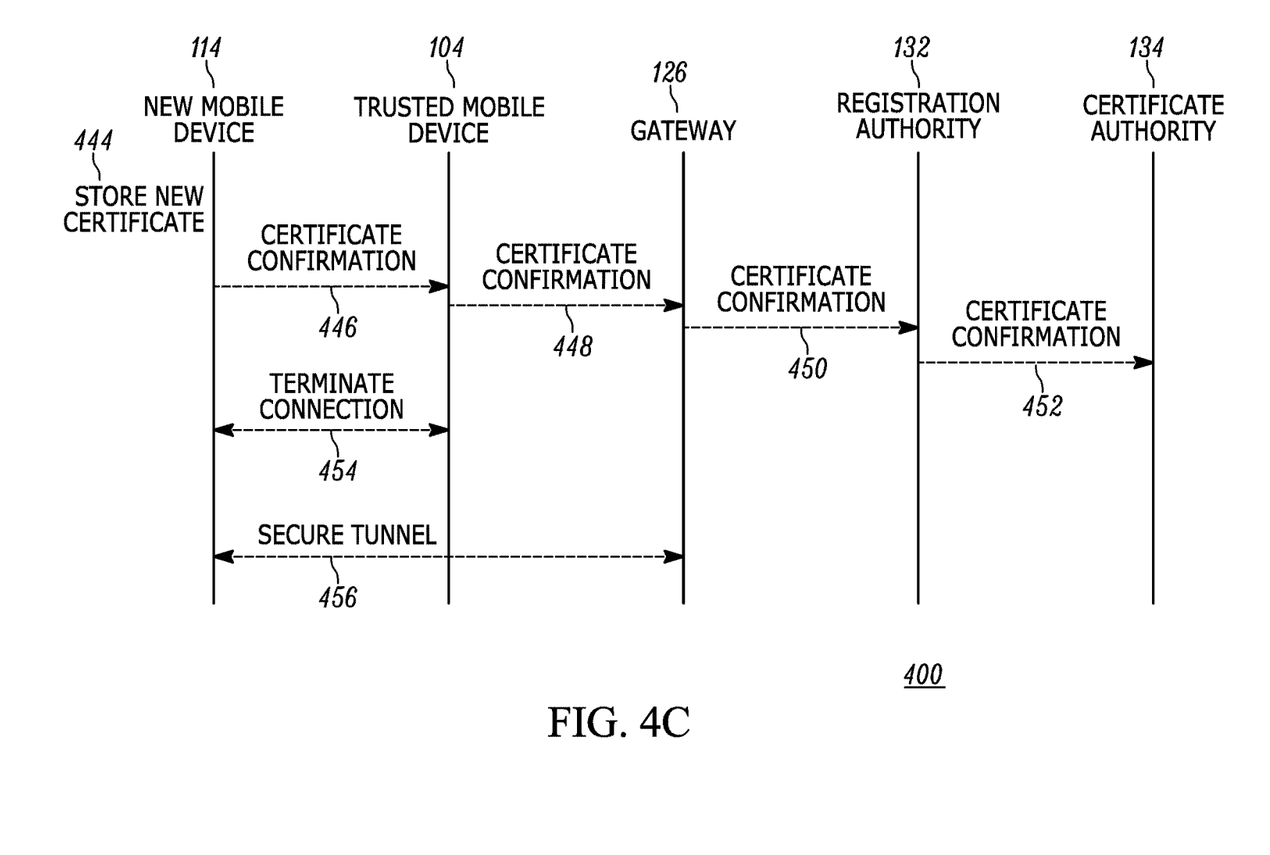
FIG. 4C is a continuation of the message flow diagrams of FIGS. 4A and 4B illustrating a method performed by the communication system of FIG. 1 in performing an initial certificate enrollment of a mobile device in accordance with some embodiments of the present invention.

Referring now to FIGS. 4A, 4B, and 4C, a message flow diagram 400 is provided that illustrates a method performed by communication system 100 in performing an initial certificate enrollment of a mobile device in accordance with some embodiments of the present invention. Message flow diagram 400 begins when a first, trusted mobile device, that is, mobile device 104, establishes (402) a first wireless connection, that is, a secure connection or "tunnel," with infrastructure 120 via second wireless interface 214, and more particularly establishes the secure connection or tunnel with gateway 126 over air interface 116 and via RAN 122.

Prior to, concurrent with, or subsequent to mobile device 104 establishing the secure connection or "tunnel" with infrastructure 120, first, trusted mobile device 104 "pairs" (404) with, that is, establishes a second wireless connection with, a second, new (that is, not yet enrolled with PKI devices 132 and 136) mobile device, that is, mobile device 114, using their respective short-range wireless interfaces 212 and over short-range wireless link 110. Many short range wireless technologies are available today, and most of them are standardized and implemented in small, low-cost integrated circuit form or in complete drop-in modules. Short range wireless connection provides a natural safeguard against hackers due to its limited range; for example, NFC pairing between two mobile devices can only happen when one mobile device touches the other mobile device.

For example, when mobile devices 104 and 114 are in close proximity to each other, then pairing can occur when two Bluetooth-enabled devices agree to communicate with each other and establish a secure connection over short-range wireless link 110 in accordance with the Bluetooth protocol. In some cases, Bluetooth can provide the needed security association, and in other cases a higher communication layer can provide the needed security association. In some cases, a shared secret, also sometimes referred to as a link key, is verified by both mobile devices 104 and 114. Once a link key is verified by both sides, an authenticated Asynchronous Connection-Less (ACL) link between the mobile devices may be encrypted to protect exchanged data. It will be appreciated by those skilled in the art that once a security association exists between the mobile devices, data can be sent securely between the mobile devices using the security association.

In another embodiment of the present invention, the pairing may be created using NFC. As known in the art, NFC pairing involves an Elliptic Curve Diffie-Hellman (ECDH) negotiation between mobile devices 104 and 114 to generate a shared session key that is stored by the encryption and key management functionality of each mobile device, such as encryption and key management module 206 or HSM 208. After the ECDH negotiation, the messages exchanged between mobile devices 104 and 114 over short-range link 110 using NFC are encrypted by the shared session key.

Subsequent to the pairing of trusted mobile device 104 and new mobile device 114, trusted mobile device 104 conveys (406), to new mobile device 114 and via the connection established over short-range wireless link 110, device RA certificate 108 and CA certificate 138, which RA and CA certificates are maintained by the trusted mobile device. In response to receiving device RA certificate 108 and CA certificate 138, new mobile device 114 generates (408) a private/public key pair, that is, a first private key '$K_{PVT\_114}$' and a corresponding first public key '$K_{PUB\_114}$,' for example, an ECDSA key pair, and stores the generated public/private key pair in its encryption and key management module 206 and/or HSM 208. Further, new mobile device 114 conveys (410) public key $K_{PUB\_114}$, to trusted mobile device 104 via their respective short-range wireless interfaces 212 and short-range wireless link 110. In response to receiving public key $K_{PUB\_114}$, trusted mobile device 104 stores the public key in its encryption and key management module 206 and/or HSM 208.

Further, in response to receiving device RA certificate 108 and CA certificate 138, new mobile device 114 obtains (412), and stores in at least one memory device 204 of mobile device 114, first biometric data, which first biometric data is biometric data associated with user 102 of trusted mobile device 104. For example, a finger print scanner of the one or more biometric data collection devices 216 of new mobile device 114 may scan a fingerprint of user 102. By way of another example, user 112 of new mobile device 114 may take a picture of user 102 by use of a digital camera of the one or more biometric data collection devices 216 of new mobile device 114. New mobile device 114 then assembles a first certification request, which certification request requests a digital certificate for new mobile device 114 and that is, first private key $K_{PVT\_114}$ (also referred to herein as a 'pogo' signature) to produce a signed first certification request, and conveys (414) the signed first certification request to trusted mobile device 104 via their respective short-range wireless interfaces 212 and short-range wireless link 110. For example, exemplary instructions for assembling the signed first certification request may include the code listed in Table 1:

TABLE 1

```
PKIMessage ::= SEQUENCE {
        header          PKIHeader,
        body            PKIBody,
        protection  [0] PKIProtection OPTIONAL,
        extraCerts  [1] SEQUENCE SIZE (1..MAX) OF CMPCertificate
                        OPTIONAL
}
PKIHeader ::= SEQUENCE {
        pvno            INTEGER      { cmp1999(1), cmp2000(2) },
        sender          GeneralName,
        recipient       GeneralName,
        messageTime  [0] GeneralizedTime           OPTIONAL,
        protectionAlg[1] AlgorithmIdentifier       OPTIONAL,
        senderKID   [2] KeyIdentifier              OPTIONAL,
        recipKID    [3] KeyIdentifier              OPTIONAL,
        transactionID[4] OCTET STRING              OPTIONAL,
        senderNonce [5] OCTET STRING               OPTIONAL,
        recipNonce  [6] OCTET STRING               OPTIONAL,
        freeText    [7] PKIFreeText                OPTIONAL,
        generalInfo [8] SEQUENCE SIZE (1..MAX) OF
                        InfoTypeAndValue           OPTIONAL
}
PKIFreeText ::= SEQUENCE SIZE (1..MAX) OF UTF8String
PKIBody ::= CHOICE {      -- message-specific body elements
        ir          [0] CertReqMessages,          --Initialization Request
        ip          [1] CertRepMessage,           --Initialization Response
......
}
PKIProtection ::= BIT STRING
ProtectedPart ::= SEQUENCE {
        header          PKIHeader,
        body            PKIBody
}
CertReqMessages ::= SEQUENCE SIZE (1..MAX) OF CertReqMsg
CertReqMsg ::= SEQUENCE {
        certReq    CertRequest,
        popo       ProofOfPossession
        regInfo    SEQUENCE SIZE(1..MAX) of AttributeTypeAndValue
}
AttributeTypeAndValue ::= SEQUENCE {
        type            OBJECT IDENTIFIER,
        value           ANY DEFINED BY type
}
CertRequest ::= SEQUENCE {
        certReqId       INTEGER,
        certTemplate    CertTemplate,
        controls        Controls OPTIONAL
}
body.ir.certReq.certTemplate = {subject=Identity of 114, publicKey=K_PUB_114}
--Use first private key K_PVT_114 to sign certReq.certTemplate
body.ir.popo.signature = computeSignature(body.ir.certReq.certTemplate,
K_PVT_114)
--Include first biometric data in generalInfo
header.generalInfo = {biometric data of user 102}
``` includes identity information and the public key ($K_{PUB\_114}$) associated with the requestor (that is, user 112/mobile device 114) and the first biometric data (that is, the biometric data associated with user 102). For example, the first certification request may be a modified version of a PKI Certificate Management Protocol (CMP) certification request, as described in Internet Engineering Task Force (IETF) Request For Comments (RFC) 4210, wherein the CMP certification request is modified to include the first biometric data in a CMP extension field. Further, new mobile device 114 signs the first certification request using its private key, In response to receiving the signed first certification request, trusted mobile device 104 validates (416) new mobile device 114's signature (that is, the 'popo' signature) of the first certification request by use of first public key $K_{PUB\_114}$, which key corresponds to the private key $K_{PVT\_114}$ used to sign the first certification request. Further, trusted mobile device 104 obtains (418), and stores in at least one memory device 204 of mobile device 104, second biometric data, which second biometric data is biometric data associated with user 112 of new mobile device 114. For example, a finger print scanner of the one or more biometric data collection devices 216 of trusted mobile device 104 may scan a fingerprint of user 112, or user 102 may take a picture of user 112 by use of a digital camera of the one or more biometric data collection devices 216 of trusted mobile device 104.

If trusted mobile device 104 determines that the first certification request is valid, the trusted mobile device assembles a second certification request, which second certification request requests a digital certificate for new mobile device 114 and includes the first biometric data (that is, the biometric data associated with user 102) and the second biometric data (that is, the biometric data associated with user 112). For example, the second certification request also may be a modified CMP certification request, which modified CMP certification request includes at least a portion of (that is, some of, most of, or all of) the first certification request, including the identity information and public key ($K_{PUB\_114}$) associated with user 112/mobile device 114 and the first biometric data, and further includes the second biometric data in a CMP extension field of the second certification request. Further, trusted mobile device 104 signs the second certification request using a second private key, that is, the private key $K_{PVT\_107}$ of the public/private key pair (that is, $K_{PUB\_108}/K_{PVT\_107}$) associated with device RA certificate 108 of trusted device 104, to produce a signed second certification request. Trusted mobile device 104 then conveys (418, 420) the signed second certification request to PKI infrastructure 130, and in particular to RA 132, via the secure connection, or "tunnel," established with gateway 126. For example, exemplary instructions executed by trusted mobile device in validating new mobile device 114's signature and assembling the signed second certification request may include the code listed in Table 2:

TABLE 2

--Validate popo signature using $K_{PUB\_114}$
result = validateSignature(popo.signature, $K_{PUB\_114}$)
If result is OK
    header.generalInfo = {biometric data of user 102, biometric data of user 112}
    protection = computerSignature(ProtectedPart{header, body}, $K_{PVT\_107}$)

In response to receiving the signed second certification request, RA 132 validates (422) the second certification request by validating trusted mobile device 104's signature of the second certification request, using a second public key, that is, the public key $K_{PUB\_108}$ of the public/private key pair associated with device RA certificate 108 of trusted device 104, and by validating, by use of public key $K_{PUB\_114}$, new mobile device 114's signature of the at least a portion of the first certification request. (Note that device RA certificate 108 of trusted device 104 is also stored in CR 306, which is accessible by both RA 132 and CA 136.) Further, by reference to biometric data database 150 and based on the first and second biometric data included in the second certification request, RA 132 verifies (424) the identities of users 102 and 112. For example, RA 132 may query biometric data database 150 for a subscriber identifier associated with each of the first and second biometric data, which query includes the first and second biometric data. In response to receiving the first and second biometric data, biometric data database 150 returns subscriber identifiers associated with each of users 102 and 112 and may further return identifiers of their respective mobile devices, that is, mobile devices 104 and 114.

In response to validating the signatures of trusted mobile device 104 and new mobile device 114 and to verifying the identities of users 102 and 112, RA 132 forwards (426), to CA 136, the at least a portion of the first certification request included in the second certification request. In response to receiving the at least a portion of the first certification request, CA 136 issues (428) a new digital certificate for new mobile device 114, which new digital certificate includes, for example and as known in the art, an identifier of new mobile device 114, a serial number of the certificate, expiration date(s), and the public key ($K_{PUB\_114}$) of mobile device 114. Further, the new digital certificate contains a digital signature produced by CA 136, that is, CA 136 signs a certificate data portion of the new digital certificate with the private key 137 ($K_{PVT\_137}$) of CA 136, which private key corresponds to the public key $K_{PUB\_138}$ included in CA certificate 138.

Either CA 136 or RA 132 then generates a first certification response, such as a CMP Certification Response, that includes the new digital certificate for new mobile device 114. For example, CA 136 may generate the first certification response, or CA 136 may convey (430) the new digital certificate for new mobile device 114 to RA 132 and the RA then may generate the first certification response. RA 132 signs the first certification response using a third private key, that is, the private key 133 ($K_{PVT\_133}$) of RA 132, and includes its RA certificate 134 in the response, which RA certificate includes the public $K_{PUB\_134}$ corresponding to private key 133. RA 132 then conveys (432, 434) the signed first certification response to trusted mobile device 104 via gateway 126, RAN 122, and the secure connection between the RAN and the trusted mobile device. For example, exemplary instructions for assembling the signed first certification response may include the code listed in Table 3:

TABLE 3

CertRepMessage ::= SEQUENCE {
    caPubs          [1]  SEQUENCE SIZE (1..MAX) OF Certificate OPTIONAL,
    response            SEQUENCE OF CertResponse
}
CertResponse ::= SEQUENCE {
    certReqId       INTEGER,
    status           PKIStatusInfo,
    certifiedKeyPair CertifiedKeyPair  OPTIONAL,
    rspInfo         OCTET STRING    OPTIONAL
}
CertifiedKeyPair ::= SEQUENCE {
    certOrEncCert     CertOrEncCert,
    privateKey      [0]  EncryptedValue    OPTIONAL,
    publicationInfo  [1]  PKIPublicationInfo OPTIONAL
}
CertOrEncCert ::= CHOICE {
    certificate      [0]  Certificate,
    encryptedCert    [1]  EncryptedValue
}
body.ip.caPubs = {certificate of RA 132}
body.ip.response.certifiedKeyPair.certOrEncCert.certificate = {new certificate for mobile device 114}
protection = computerSignature(ProtectedPart{header, body}, $K_{PVT\_133}$)

In response to receiving the signed first certification response, trusted mobile device 104 validates (436) RA 132's signature of the first certification response by use of a third public key, that is, $K_{PUB\_134}$, corresponding to the third private key ($K_{PVT\_133}$) used to sign the first certification response. Trusted mobile device 104 then assembles a second certification response, such as a CMP Certification Response, that includes the new digital certificate for new mobile device 114 and conveys (438) the second certification response to new mobile device 114 via their respective short-range wireless interfaces 212 and short-range wireless link 110. For example, exemplary instructions for assembling the signed second certification response may include the code listed in Table 4:

TABLE 4 body.ip.caPubs = {device RA certificate 108}
body.ip.response.certifiedKeyPair.certOrEncCert.certificate = {new certificate for mobile device 114}
protection = computerSignature(ProtectedPart{header, body}, $K_{PVT\_107}$)

In response to validating the first certification response, trusted mobile device 104 strips off the signature of RA 132 (that is, $K_{PVT\_133}$) from the first certification response and assembles a new certification response, in which the trusted mobile device includes the new digital certificate and signs the new certification response with mobile device 104's device RA private key 107, that is, $K_{PVT\_107}$.

In response to receiving the signed second certification response, new mobile device 114 (440) validates the signed second certification response using the public key corresponding to the private key used to sign the second certification response, that is, using the device RA certificate 108 public key $K_{PUB\_108}$ corresponding to $K_{PVT\_107}$. Further, new mobile device 114 authenticates (442) the new digital certificate using the CA certificate 138 public key, that is, '$K_{PUB\_138}$,' corresponding to the private key $K_{PVT\_137}$ of CA 136 that was used to sign the new digital certificate. In response to successfully validating the signed second certification response and authenticating the new digital certificate, new mobile device 114 (444) stores the new digital certificate in its encryption and key management module 206 and/or HSM 208.

At this point, the certificate enrollment of the new mobile device 114 may be considered to be complete and message flow diagram 400 may end. However, in another embodiment of the present invention, new mobile device 114 and trusted mobile device 104 further may terminate (454) their connection over short range wireless link 110 and the new mobile device can establish (456) a secure connection, or tunnel, with infrastructure 120 using its new digital certificate and without connecting through trusted mobile device 104.

Further, in yet other embodiments of the present invention, in response to validating the signed second certification response and authenticating the new digital certificate, new mobile device 114 also may confirm receipt and authentication of the new digital certificate by conveying (446, 448, 450, 452) a certification confirmation, such as a CMP Certificate Confirmation, to PKI infrastructure 130 and one or more of PKI devices 132 and 136 via short-range wireless link 110, trusted mobile device 114, the secure connection between the trusted mobile device and RAN 122, RAN 122, and gateway 126.

Thus, by providing for newly enrolling mobile device 114 to enroll using a secure connection with an already enrolled, trusted mobile device 104 and to piggyback on the secure connection established by the trusted mobile device with PKI infrastructure 130, communication system 100 provides a reliable means of cryptographically protecting and binding an initial certification request before sending the initial certification request across the communication system. Further, by providing for each of mobile devices 104 and 114 to provide biometric data associated with a user of the other mobile device, communication system 100 provides for a confirmation of the identities of the users 102, 112 of each mobile device 104, 114 and better assures that a hacker will not be able to use trusted mobile device 104 to illegitimately obtain a digital certificate.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing initial certification enrollment in a wireless communication system, the method comprising:
   establishing, by a first mobile device, a first wireless connection with an infrastructure;
   establishing, by the first mobile device, a second wireless connection with a second mobile device;
   receiving, by the first mobile device, a first certification request from the second mobile device and over the second wireless connection, wherein the first certification request comprises a request for a digital certificate for the second mobile device and first biometric data associated with a user of the first mobile device;
   obtaining second biometric data, wherein the second biometric data is associated with a user of the second mobile device;
   conveying a second certification request to the infrastructure and over the first wireless connection, wherein the second certification request comprises the request for the digital certificate for the second mobile device, the first biometric data, and the second biometric data;
   in response to conveying the second certification request to the infrastructure, receiving, from the infrastructure and over the first wireless connection, a certification response comprising the digital certificate for the second mobile device wherein the certification response is signed by a third private key;
   conveying, to the second mobile device over the second wireless connection, the digital certificate;
   conveying, by the first mobile device to the second mobile device, a digital certificate associated with the first mobile device;
   in response to conveying, to the second mobile device, the digital certificate associated with the first mobile device, receiving, from the second mobile device, a public key;
   wherein receiving the first certification request comprises receiving the first certification request signed by a private key corresponding to the public key;
   wherein the private key comprises a first private key and wherein conveying a second certification request to the infrastructure comprises signing the second certification request using a second private key to produce a signed second certification request and conveying the signed second certification request to the infrastructure;
   wherein the method further comprises validating the first certification request based on the public key.

2. The method of claim 1, wherein the digital certificate associated with the first mobile device is a registration authority certificate of the first mobile device.

3. The method of claim 1, wherein the second private key is a private key associated with a registration authority certificate of the first mobile device.

4. The method of claim 3, further comprising validating the signed second certification request based on a first public key associated with the first private key and a second public key associated with the second private key.

5. The method of claim 4, further comprising:
   issuing the digital certificate for the second mobile device in response to validating the signed second certification request.

6. The method of claim 1, wherein conveying the digital certificate comprises:
   conveying, to the second mobile device over the second wireless connection, a certification response comprising the digital certificate, wherein the certification response is signed by a private key associated with the first mobile device.

7. The method of claim 1, further comprising:
   verifying an identity of the user of the first mobile device and an identity of the user of the second mobile device based on the first biometric data and the second biometric data; and
   issuing the digital certificate in response to verifying the identity of the user of the first mobile device and the identity of the user of the second mobile device.

8. A mobile device capable of facilitating initial certification enrollment in a wireless communication system, the mobile device comprising:
   a processor;
   an at least one memory device that is configured to store instructions that, when executed by the processor, cause the processor to:
      establish a first wireless connection with an infrastructure;
      establish a second wireless connection with another mobile device;
      receive a first certification request from the another mobile device and over the second wireless connection, wherein the first certification request comprises a request for a digital certificate for the another mobile device and first biometric data associated with a user of the mobile device;
      obtain second biometric data, wherein the second biometric data is associated with a user of the another mobile device;

convey a second certification request to the infrastructure and over the first wireless connection, wherein the second certification request comprises the request for the digital certificate for the another mobile device, the first biometric data, and the second biometric data;

in response to conveying the second certification request to the infrastructure, receive, from the infrastructure and over the first wireless connection, the digital certificate for the another mobile device by receiving, from the infrastructure and over the first wireless connection, a certification response comprising the digital certificate for the another mobile device, wherein the certification response is signed by a third private key;

convey, to the another mobile device over the second wireless connection, the digital certificate;

convey, to the another mobile device, a digital certificate associated with the mobile device;

in response to conveying to the another mobile device the digital certificate associated with the mobile device, receive, from the another mobile device, a public key;

wherein receiving the first certification request comprises receiving the first certification request signed by a private key corresponding to the public key; and wherein the private key comprises a first private key and wherein the at least one memory device is configured to convey a second certification request to the infrastructure by:

signing the second certification request using a second private key to produce a signed second certification request conveying the signed second certification request to the infrastructure; and wherein the at least one memory device is configured to store instructions that, when executed by the processor, further cause the processor to validate the first certification request based on the public key.

9. The mobile device of claim 8, wherein the at least one memory device is configured to maintain a registration authority certificate of the mobile device and wherein the digital certificate associated with the mobile device is the registration authority certificate.

10. The mobile device of claim 8, wherein the second private key is a private key associated with a registration authority certificate of the mobile device.

11. The mobile device of claim 8, wherein the at least one memory device is configured to convey the digital certificate by:

conveying, to the another mobile device over the second wireless connection, a certification response comprising the digital certificate for the another mobile device, wherein the certification response is signed by a private key associated with the mobile device.

* * * * *